United States Patent [19]

Papay

[11] 4,257,065
[45] Mar. 17, 1981

[54] VIDEO CLAMP AND INVERTER CIRCUIT

[75] Inventor: Joseph M. Papay, Kitchener, Canada

[73] Assignee: Pay Television Corporation, Manhasset, N.Y.

[21] Appl. No.: 104,558

[22] Filed: Dec. 17, 1979

[51] Int. Cl.³ .............................................. H04N 1/44
[52] U.S. Cl. ..................... 358/172; 358/124
[58] Field of Search ............... 358/170, 171, 172, 120, 358/124, 114, 21 V

[56] References Cited

U.S. PATENT DOCUMENTS

| | | | |
|---|---|---|---|
| 3,750,038 | 7/1973 | Meise | 358/171 |
| 3,924,059 | 12/1975 | Horowitz | 358/124 |
| 4,075,660 | 2/1978 | Horowitz | 358/124 |
| 4,197,556 | 4/1980 | Isono | 358/21 V |

*Primary Examiner*—Richard Murray
*Assistant Examiner*—Michael A. Masinick
*Attorney, Agent, or Firm*—J. Gibson Semmes; John B. Mason

[57] ABSTRACT

A high performance video clamp and self-balancing inverter circuit for providing the DC coupling of a video signal together with substantially perfect inversion of any portion of a composite television signal. Under the control of synchronously timed pulses, two switches are alternately turned on and off to selectively apply the video signal to either the inverting or non-inverting input terminal of a video amplifier, thus separating signal portions selected to be inverted from those portions selected to remain non-inverted. To ensure perfect balance between inverted and non-inverted output signals, prior to processing, at least two reference pedestals are added to each field of the composite video signal to raise selected blanking level portions thereof to a level equal to 50% of the reference white level. When received, each pair of reference pedestals is separated via activation of the switches so that, at the output of the video amplifier, the first pedestal appears as a non-inverted signal and the second pedestal appears as an inverted signal. A selectively switched, negative feedback control system samples these respective output signals and derives an error signal of such polarity that the DC levels of both reference pedestals are balanced at precisely 50% of the reference white level. Selective activation of a keyed clamp, which completes the feedback loop, clamps the video signal to this 50% reference potential, thus assuring constant balance between inverted and non-inverted portions of the output signal, regardless of input video signal changes.

19 Claims, 3 Drawing Figures

VIDEO CLAMP AND INVERTER CIRCUIT

BACKGROUND OF THE INVENTION

This invention broadly relates to television signal processing and, more particularly, to a combined video clamp and self-balancing inverter circuit for performing the DC coupling of a video signal between source and load and for providing substantially perfect inversion of any portion of a composite video signal. Accordingly, the invention has general utility for all television applications which require establishment of a DC reference level and/or inversion or reinversion of selected portions of a composite video signal.

Clamping circuits, per se, are well known in the television art and in the communications field in general. It is also well known that keyed clamps provide the most satisfactory means of establishing and maintaining a constant DC reference potential for a video signal. Such clamps eliminate the temperature sensitivity problems associated with DC coupled systems, and, as well, avoid the DC level shifts and poor low frequency performance associated with AC coupled video systems.

Inversion of selected portions of a video signal is also generally known and utilized in video equipment such as processing amplifiers, transmitters, and studio cameras. With the development of subscription television systems, encoding techniques have evolved which include selective inversion of the active video signal components of a standard television signal, e.g. on the basis of fields, lines, or groups of lines thereof. Typically, in such prior art systems, the phase inverting characteristics of certain transistor configurations, e.g. common emitter or common source, are employed to effect signal inversion at the encoder, and reinversion thereof at the decoder. Frequently, both inverted and non-inverted signals are obtained from separate output terminals of a single transistor stage, e.g. the collector and emitter. However, because such arrangements impart a different gain to the inverted and non-inverted signals, reinversion, or reconstitution, of the original video information is necessarily imperfect, producing distortion which degrades the quality of the reproduced images. These deficiencies are especially aggravated in those systems where inversion of whole fields is involved.

There is no known system nor technique, other than the present invention, which is capable of maintaining a constant balance between inverted and non-inverted signals, during both encoding and decoding, so that the inverted video information is reinverted exactly to its original form and characteristic.

SUMMARY OF THE INVENTION

The invention is primarily directed to a high performance video clamp and self-balancing inverter circuit for providing substantially perfect inversion of any portion of a composite video signal and for providing, as well, the DC coupling thereof between source and load. The invention utilizes a self-balancing negative feedback control technique which ensures that the selectively inverted signal portions bear a uniformly balanced, and fixed, relationship to the non-inverted portions so that the informational content of the inverted signal may be precisely recovered upon subsequent reinversion.

The video signal to be processed is fed AC coupled into an input stage, which essentially comprises a keyed clamp for selectively clamping the signal to a DC reference potential. The output of this input stage is selectively applied, via operation of first and second switches, to the non-inverting and inverting input terminals, respectively, of a video amplifier. The output of this amplifier, which essentially constitutes the output of the inverter circuit, is coupled to the input stage via a feedback circuit which is selectively operable to balance the respective DC levels of the inverted and non-inverted signal outputs of the video amplifier.

The present technique includes insertion of at least two reference pedestals into the composite video signal, each field, to raise selected blanking level portions thereof to precisely fifty percent of the reference white level. The first of each pair of received reference pedestals is applied via selective activation of the first switch to the non-inverting input terminal of the video amplifier, thus producing a non-inverted reference pedestal at the output thereof. The next received reference pedestal is applied, via selective activation of the second switch, to the inverting input terminal of the video amplifier, and, accordingly, results in an inverted reference pedestal at the output of the video amplifier. Since these inverted and non-inverted reference pedestals are processed by the circuitry which is thereafter utilized to process the subsequently received portions of the signal, they represent, respectively, the inverting and non-inverting transfer performance of the inverter circuit. The feedback circuit functions to sample the relative DC levels of the output reference pedestals, and, if there is a difference there between, to derive an error voltage of a magnitude and polarity that will restore the original equality between the two, producing a single, balanced DC reference, for both inverted and non-inverted signals, which is precisely at 50% of the reference white level.

In a preferred application of the present invention to a subscription television system in which only the active video portions of the signals are inverted, clamping to a reference level of precisely 50% provides a pivot point for the inversion process that is centrally positioned within the permissible excursion range of the luminance signal. Thus, by inverting around this pivot point, the resultant inverted portions of the output signal are not only within prescribed limits, but also contain the complete informational content of the original signal.

DESCRIPTION OF THE PREFERRED EMBODIMENT

Figure 1:
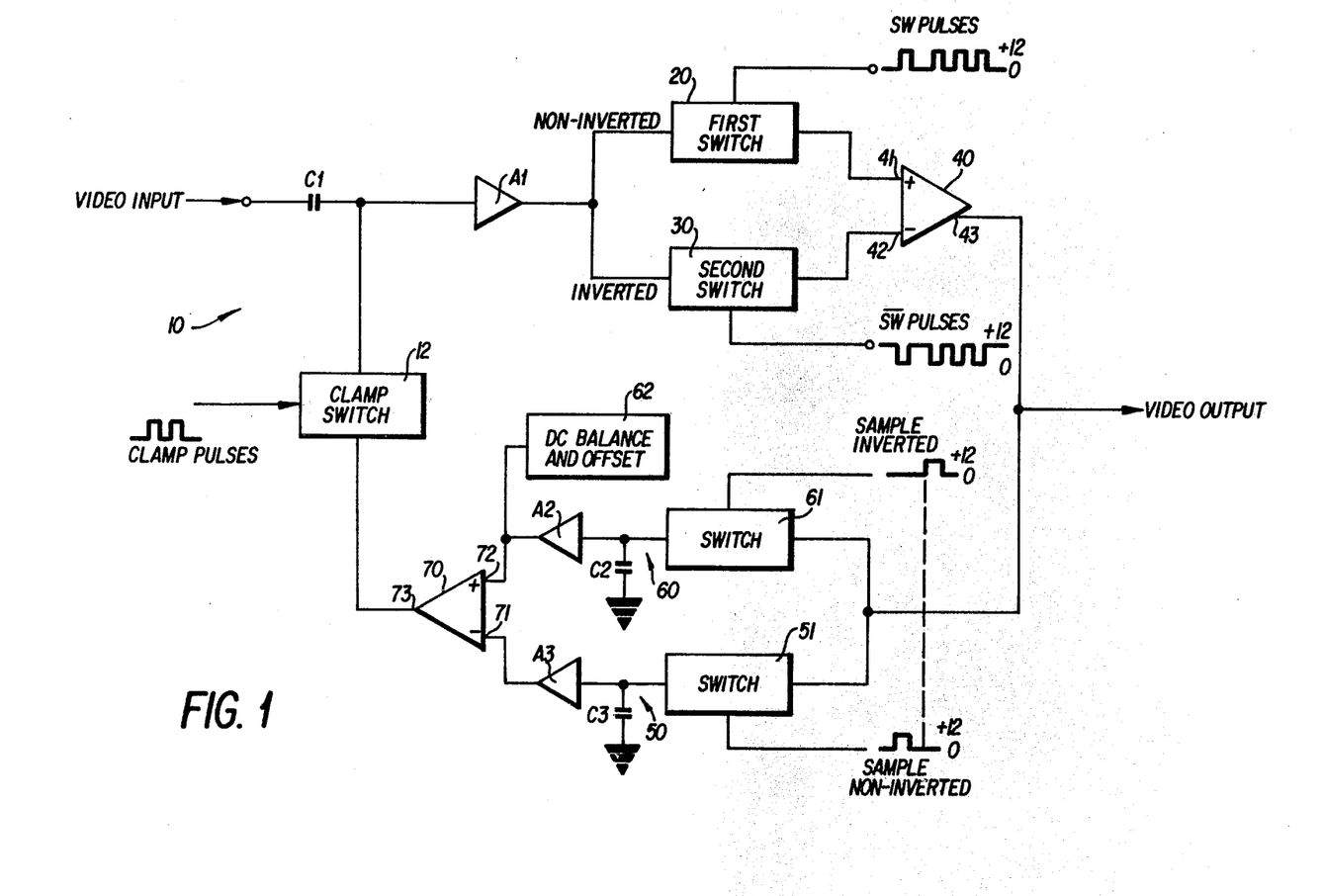
FIG. 1 is a general block diagram of the present invention.

Referring initially to FIG. 1, there is shown a simplified block diagram of the preferred form of the present invention. As illustrated in FIG. 1, and as will be described in greater detail hereinafter, the invention preferrably includes an input stage 10 for receiving a video signal input, which is so labeled. It will be appreciated by one skilled in the art that the supplied video signal could be obtained from any suitable video source. That is to say, the present invention as functionally represented in FIG. 1 could be easily adapted for compatible integration into any video system in which selective inversion and/or DC coupling of the video signal is required. Such a compatible video system need only include signal processing means for inserting the reference pedestals into the composite video signal and pulse generating means for supplying the pulses needed to selectively activate, in appropriate timed synchronism, the various switches of the invention. The function of these pulses, which have been labeled on FIG. 1 as clamp pulses, SW and $\overline{SW}$ pulses, sample inverted pulses and sample non-inverted pulses, will be fully described hereinafter.

Referring again to FIG. 1, input stage 10 includes capacitor C1, clamp switch 12, and buffer-amplifier A1. Capacitor C1 provides AC coupling of the inputed video signal and, in conjunction with buffer-amplifier A1 and clamp switch 12, forms a keyed clamp. To function properly as a keyed clamp, it is necessary that buffer-amplifier A1 have a very high input impedance to prevent discharge of capacitor C1 when, in operation, clamp switch 12 is disconnected.

The signal which appears at the output of input stage 10 is selectively applied via operation of first and second switches, 20 and 30, respectively, to either the non-inverting terminal 41 or the inverting input terminal 42 of video amplifier 40. Video amplifier 40 operates so that the signals applied to non-inverting input terminal 41 appear with the same phase at the output terminal 43. Signals applied to inverting input terminal 42, however, appear at output terminal 43 with a 180° phase shift. As shown in FIG. 1, first switch 20 is controlled i.e. turned on and off, by SW pulses while second switch 30 is controlled by $\overline{SW}$ pulses. As diagramatically represented on FIG. 1, SW and $\overline{SW}$ pulses are synchronously timed and of opposed polarities so that first and second switches are alternately turned on and off, i.e. when first switch 20 is on, second switch 30 is off, and vice versa. In operation, SW and $\overline{SW}$ pulses are selected so that the composite video signal is separated into portions to be inverted and portions to remain non-inverted. It will be appreciated that, by appropriate selection of the timing and duration of SW and $\overline{SW}$ pulses, any portion of the video signal may be inverted.

One having skill in the field of communications and in the art of digital control systems, will further appreciate that a system of conventional design could deliver a train of SW and $\overline{SW}$ pulses in preselected manner to accomplish the desired selective inversion. Since the video signal variations are "slow" in the time domain of digital switching, it will be apparent that a switching pattern could be developed which would change dynamically as a function of time. Because of this digitally controlled, dynamic switching capability, the present invention is well adapted for use in a subscription television system which employs encoding by selective inversion of the video signals. In the encoder of such a system, the SW and $\overline{SW}$ pulses could be selected to invert the video signal components on any basis, e.g. by line, groups of lines, or whole fields or groups of fields.

At the decoder, the process, i.e. the timing and duration of the SW and $\overline{SW}$ pulses, would mirror the encoding process so that the inverted information is reinverted at the precise intervals.

As so labeled in FIG. 1, the output of the video amplifier constitutes the video output of the inverter circuit. By way of example, in the encoder of the preferred subscription television application of the present invention, this video output would be coupled to the modulator.

The remaining elements in FIG. 1 constitute the selectively switched, negative feedback circuit which ensures the constant balance between inverted and non-inverted portions of the video output signal. Generally, as shown, a sample of the video output signal is taken from a common connection with the output terminal 43 of the video amplifier and fed back into the input stage 10. For the self-balancing operation of this feedback circuit, in addition to the switch actuating pulses shown on FIG. 1, it is necessary to add at least two reference pedestals per field to the composite video signal prior to that signal being applied to the input stage 10. As previously noted, the addition of these pedestals, so as to raise selected blanking level portions of the composite video signal to a level equal to 50% of the reference white level, may be accomplished by any suitable signal processing means, (not shown). These reference pedestals may be introduced into any unused portion of the vertical blanking interval, or into the front and back porch sections of the horizontal sync pulses, or into a combination of both of these. As will be more fully discussed hereinafter, since the feedback and clamping operation of the circuit occurs only during sampling of these reference pedestals, it is preferable to utilize a technique that inserts the pedestals into the front and back porches of the horizontal sync pulses. Utilizing this technique, the sampling and clamping is performed at the horizontal, or line, frequency rate rather than at the vertical, or field rate. With the balancing objectives of the present invention in mind, for overall system performance, it is likewise preferable to employ a technique in which the reference pedestals are processed in pairs, the second pedestal in each pair being inverted while the first pedestal remains non-inverted. For clarity, the following discussion will focus only upon one of such pairs of reference pedestals. It is to be understood that the timing of the discussed pulses relative to this pair of pedestals has been predetermined.

Accordingly, during the time interval corresponding to the reception of the first reference pedestal, first switch 20 will be turned on while second switch 30 will be turned off. The first reference pedestal will thus be applied to the non-inverting input terminal 41 of the video amplifier and will appear at the output 43 as a non-inverted reference pedestal. During reception of the second reference pedestal, second switch 30 will be turned on while first switch 20 is turned off, thus applying the second reference pedestal to the inverting input terminal 42 and producing an inverted reference pedestal at the output 43 of the video amplifier. Since each of these reference pedestals was initially at precisely 50% of the reference white level, and since each receives the same gain from video amplifier 40, the corresponding output pedestals provide a proportional measure of the inverting performance of the circuit. Generally, the feedback circuit functions to selectively sample this performance, i.e. pedestals, and derive an error signal of such polarity as to balance the two at precisely 50% of the reference white level.

Considering again, Fig. 1, during the interval that the first, or non-inverted, reference pedestal appears at output terminal 43, a first sample and hold circuit, generally designated 50, is activated to apply a first sampling potential to the negative input terminal 71 of operational amplifier 70. As shown, first sample and hold circuit 50, which comprises switch 51, capacitor C3, and high input impedance buffer-amplifier A3 is selectively activated by the pulse labeled sample non-inverted pulse. During reception of the second, or inverted, reference pedestal, the sample inverted pulse is available to actuate second sample and hold circuit 60 to apply a second sampling potential to the positive input terminal 72 of operational amplifier 70. It will be noted that, while the second sample and hold circuit 60 generally corresponds to the first sample and hold circuit 50, including switch 61, capacitor C2 and high input impedance buffer A2, it additionally includes a DC balance and offset control 62. The function of this latter element is more fully discussed below.

The effect of the above operation of switches 51 and 61 is to place, on capacitors C3 and C2, respectively, charges which are equivalent to the respective levels of the non-inverted and inverted output reference pedestals. These charges are sensed by buffer-amplifiers A3 and A2, respectively, before being applied to input terminals 71 and 72, respectively, of operational amplifier 70. Since amplifiers, A2 and A3 are unity gain buffers, it will be seen that, at terminals 71 and 72, there are voltage levels which represent, respectively, the non-inverted and inverted output reference pedestals. Thus, if there is a difference between the inverting and non-inverting transfer operation of the inverter circuit, the relative relationship of the respective voltages on terminals 71 and 72 will be an equivalent measure of that difference. That is to say, a difference in the respective potentials at terminal 71 and 72 represent the error between the two reference pedestals. Since both reference pedestals were initially at precisely 50% of the reference white level, if the second reference pedestal, i.e. the one which was applied to terminal 42 of video amplifier 40, is perfectly inverted, the resultant output signal at terminal 43, although inverted, will have a proportional voltage level, which, when compared with the level of the first, or non-inverted, output reference pedestal, remains at exactly the 50% level. This relative balance between the two output pedestals appearing at terminal 43 of the video amplifier will, accordingly, produce voltages at terminal 71 and 72 of operational amplifier 70 which are identical. If, however, for any reason there is an imbalance between the relative levels of the two output reference pedestals, a measure of this imbalance will be present at input terminals 71 and 72. As illustrated in FIG. 1, these input terminals are differentially connected with operational amplifier 70, with terminal 71 being the negative differential input and terminal 72 being the positive differential input. This connection provides a common-mode rejection so that operational amplifier 70 is sensitive only to the difference between the voltages appearing at input terminals 71 and 72. Thus, a difference in the DC voltage levels at terminals 71 and 72 will result in an amplified error voltage at the output terminal 73 of operational amplifier 70. Under control of the clamp pulses, this error voltage is fed back into the input stage 10 via clamp switch 12. As illustrated, the clamp pulses coincide precisely with the sample pulses associates with switches 51 and 61 so that clamp switch 12 is on, and the error voltage, if any, is fed back, during reception of each reference pedestal.

Because of the polarity of the system, i.e. the polarity of the sample and hold circuits, vis-a-vis video amplifier 40 and associated circuitry, any resultant error voltage will be of such magnitude and polarity as to restore the relative equality between the levels of the reference pedestals. For example, assume that, because of processing imbalance in previous stages, the reference pedestal appearing at the inverting input terminal 42 of the video amplifier is of lower voltage relative to the voltage of the reference pedestal appearing at the non-inverting input terminal 41, e.g. at 49% level relative to the 50% level originally established. Since this "low" reference pedestal is applied to the inverting input terminal 42, it becomes inverted so that the level of the resultant output reference pedestal is correspondingly "too high" i.e. at a relative 51% level. This level is sensed by the second sample and hold circuit 60 so as to place a "high" voltage on the positive differential input terminal 72 of operational amplifier 70, which in turn, produces a positive error voltage at output terminal 73 thereof. Since clamp switch 12 is closed, this positive error voltage is introduced into input stage 10, pushing the low (49%) reference potential on capacitor C1 back up to the 50% level. It will be seen that this self-balancing operation of the feedback circuit uniformly corrects any difference between the DC levels of the reference pedestals so that the two have a balanced, and constant, relative equality. This balanced DC reference level results in a uniform charge of 50% of the reference white level being placed upon capacitor C1 in the input stage 10. Since the composite video signal is clamped to this potential, balanced inversion about the 50% level is assured. It was previously noted that the second sample and hold circuit includes DC balance and offset control 62 which is connected in common with the positive input 72 of operational amplifier 70. This control is operable to vary the quiescent potential at input terminal 72 and thereby, via the selective feedback operation, the relative DC levels of the two reference pedestals at the output terminal 43 of video amplifier 40. With this offset capability, it is possible to operate the circuit in an unbalanced mode, clamping selected portions of the video signal to different DC levels.

Figure 2A:
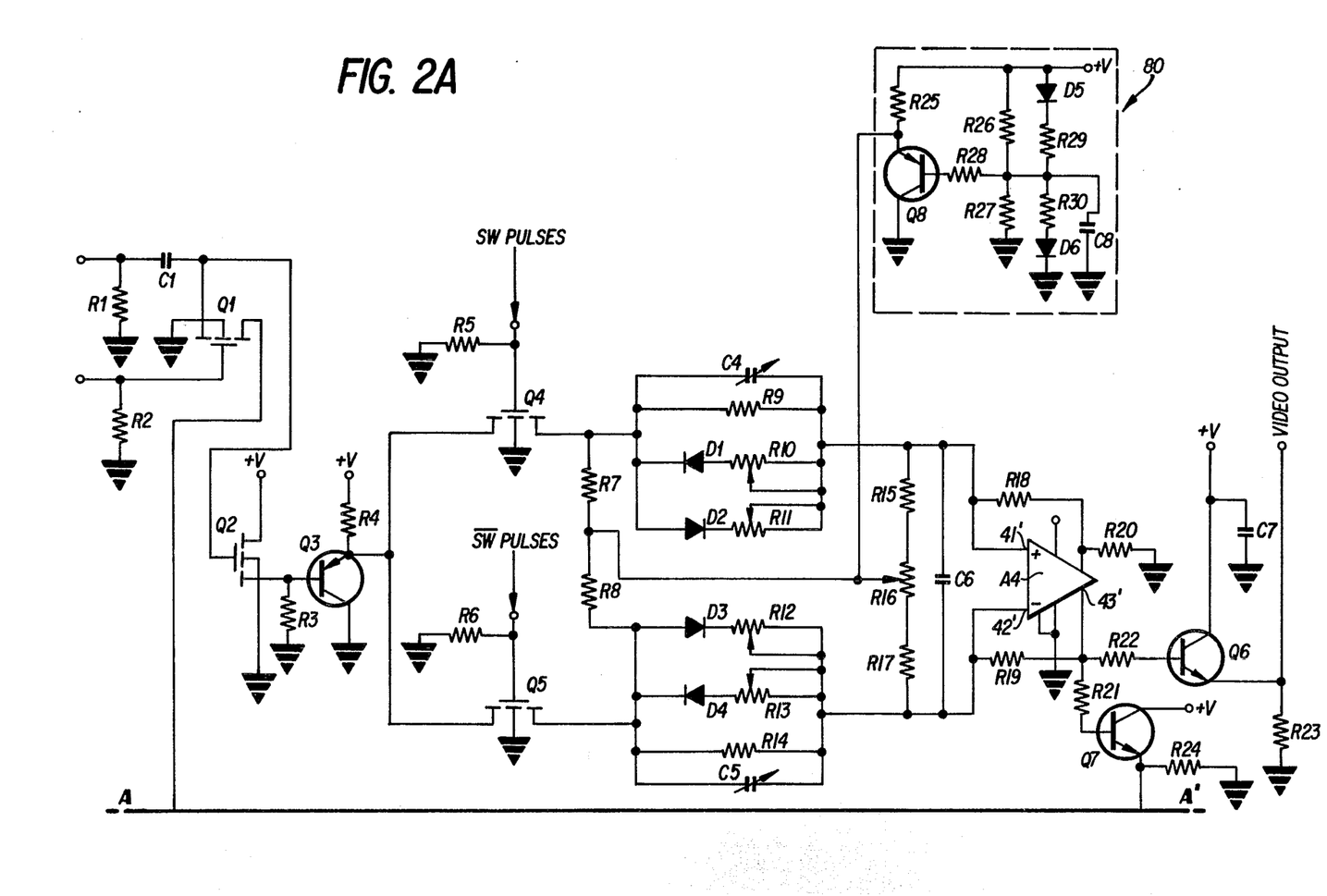
FIGS. 2A and 2B together provide a detailed electrical schematic of the preferred video clamp and inverter circuit according to the invention.
Figure 2B:
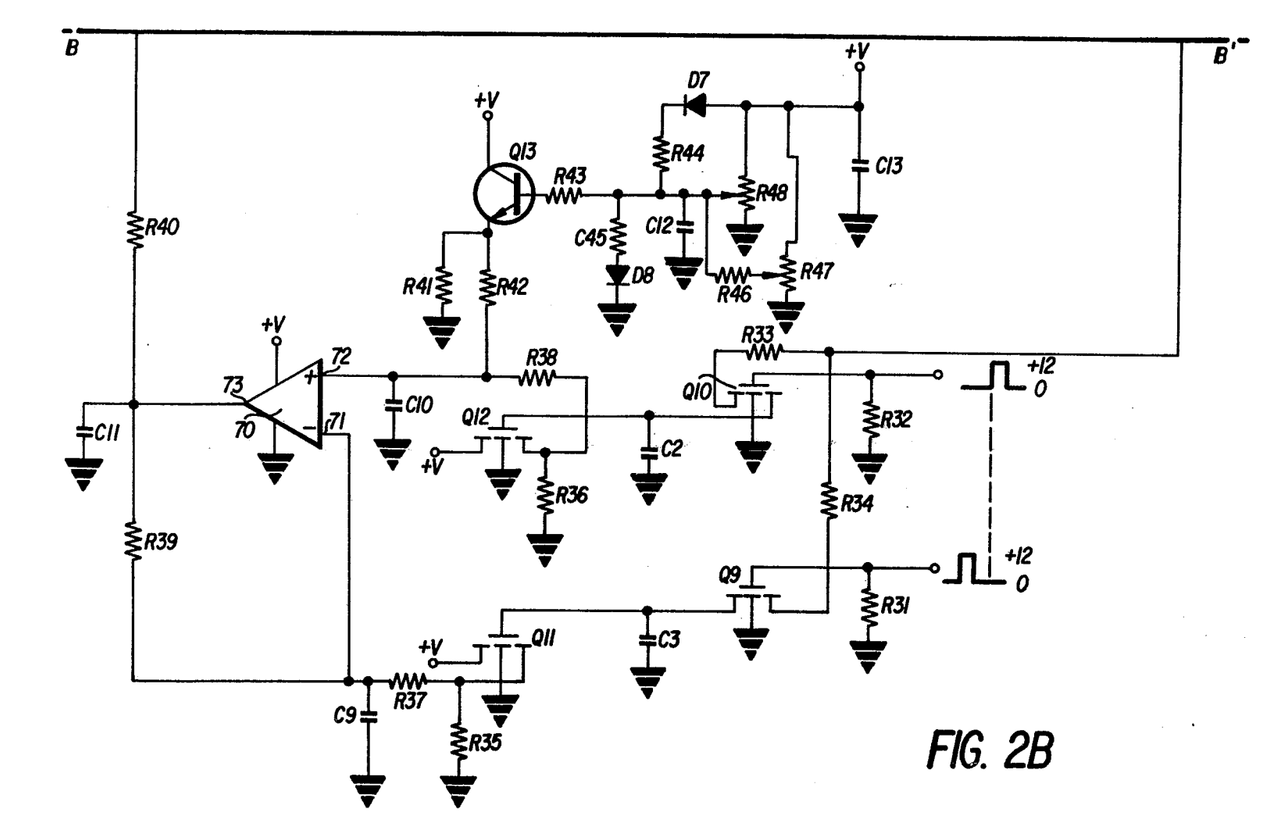

FIGS. 2A and 2B illustrate, in more specific detail, the inverter circuit and clamp according to applicant's invention. The numerical designation of components in FIG. 1 have been carried over to FIGS. 2A and 2B, where applicable.

As shown in FIG. 2A, the video input is coupled into the circuit via capacitor C1. Terminating resistor R1, which connects the input line with ground, provides suitable impedance matching with the source of the applied video signal. The value of R1, will of course, depend upon the characteristic impedance of the video source chosen for a particular application of the invention. The switching function corresponding to that of clamp switch 12 in FIG. 1, which is necessary for the keyed clamping operation of the circuit, is performed by MOSFET Q1, which is provided with gate resistor R2.

The AC coupled signal is fed to MOSFET Q2, which is connected as a source follower and, accordingly, has a very high input impedance. MOSFET Q2 thus corresponds functionally with buffer amplifier A1 in FIG. 1 and is included to prevent capacitor C1 from discharging through subsequent stages of the circuit when switching MOSFET Q1 is disconnected. The output of MOSFET Q2 is taken across source resistor R3 and applied to the base of transistor Q3. Because of the low output impedance provided by the emitter follower configuration of transistor Q3, which includes emitter resistor R4, this device is utilized as a buffer amplifier, providing electrical isolation between the stage consisting of the elements described so far, and the switching stage which follows.

This switching stage includes two MOSFET switches, Q4 and Q5, which functionally correspond with first switch 20 and second switch 30, respectively, in FIG. 1. The buffering action of transistor Q3 places negligible load upon MOSFET's Q4 and Q5 so that these devices operate as single pole, single throw switches when turned on by application of SW and $\overline{SW}$ switching pulses to the respective gates thereof. As discussed with respect to FIG. 1, the SW and $\overline{SW}$ switching pulses are supplied by suitable pulse generating means and are of such polarity, timing, and duration as to turn devices Q4 and Q5 on and off in opposed synchronism to selectively separate portions of the video signal to be inverted from those portions to remain non-inverted. Thus, when inversion is desired, the SW and $\overline{SW}$ pulses will be such as to turn Q5 on and turn Q4 off. For processing normal, or non-inverted, video signal portions, an opposite pattern of switching pulses would be supplied so that Q4 is on while Q5 remains off. Referring to FIG. 2A, it can be seen that the respective networks immediately following MOSFET switches Q4 and Q5 are identical, so that the selected normal and inverted portions of the video signal pass through electrically equivalent circuitry before being supplied to the non-inverting and inverting terminals, 41' and 42', respectively of differential input wideband amplifier A4. The operation of amplifier A4 corresponds to the operation of video amplifier 40 as hereinabove described in the discussion of FIG. 1. Accordingly, signals applied to the non-inverting or positive, input terminal 41' will appear with the same phase at positive output terminal 43'. Signals applied to the inverting, or negative, input terminal 42' will produce an output signal with a 180° phase change. Since balanced inversion is a paramount concern in the present invention, amplifier A4 is provided with stability producing feedback resistors R18 and R19 and load balancing resistor R20, which is connected to the negative output terminal thereof. The value of resistor R20 is selected to be equal to the load on the positive output 43' so that amplifier A4 has a fairly symmetrical load on both outputs. To prevent parasitic oscillations in the inverter circuit, capacitor C6 is provided in shunt across the input terminals, 41' and 42', of amplifier A4. The two previously mentioned identical networks, which are interposed between MOSFET switches Q4 and Q5 and amplifier A4, provide linearity correction and frequency and phase compensation for the video signals passed therethrough. In the upper network, linearity correction of the normal video signals is provided by diodes D1 and D2 and resistors R10 and R11 associated therewith. It is preferable that diodes D1 and D2 be of the "pin" type which display an extremely sharp transfer function. Resistors R10 and R11 are variable so that, by appropriate positioning of the respective wipers, diodes D1 and D2 can be effectively taken out of the circuit. Correspondingly, resistors R10 and R11 can be adjusted so that the voltage which is available across resistor R9 is sufficient to cause the respective diodes, D1 and/or D2 to conduct. Because of the sharp transfer functions of the preferred "pin" diodes, from the onset of conduction the total resistance will be reduced to the parallel combination of resistors R9 and the adjusted values of either R10 or R11. This reduction in resistance results in a compression, or bending of the signal. Since diodes D1 and D2 face in opposite directions, it is possible to introduce this non-linear compression into any part of the video signal. It will be apparent that linearity correcting circuit for the lower, or inverted network, comprising diodes D3 and D4 and resistors R12 and R13, function in identical fashion to correct for non-linearity in that segment. These identical linearity correcting circuits are primarily included to compensate for the non-linear distortional effects of preceding stages, e.g. amplifier circuits in system components preceding the inverter circuit. Thus, in production set up, proper adjustment of the corrector circuits will introduce transfer functions which are opposite to, and hence corrective of, any non-linearity.

The combination of resistor R9 and capacitor C4 in the upper network and resistor R14 and capacitor C5 in the lower network provide frequency and phase compensation for the respective networks. By selecting the value of capacitor C4 and C5 the signal response can be varied between high and low pass to boost or attenuate selected frequency components of the video signal. As well, varying capacitor C4 or C5 will introduce a phase shift which can be utilized to offset any undesired phase changes that may be unavoidably introduced by preceding stages.

The AC balance between the normal and inverted video signals can be set by adjustment of the AC balance control R16, a variable resistor. Adjustment of control R16 changes the resistive division ratio resulting from the combination therewith of resistors R15 and R9, in the upper network, and resistors R17 and R14 in the lower network. Thus, through adjustment of control R16, the signals which are selectively applied to terminals 41' and 42' may be suitably attenuated. Since the wiper of control R16 and all of the resistive components of the divider networks are connected with a tracking power supply 80, it will be seen that there are no DC voltage differences there-between, and, hence, only AC signals are attenuated. As shown in FIG. 2A, the wiper of control R16 is connected so that the division ratios of the upper and lower networks are varied in an opposed, relative relationship. Since amplifier A4 operates in a differential mode, the overall effect of adjusting control R16 is to vary the relative amplitudes, at the output of amplifier A4, of the inverted and non-inverted portions of the applied signal.

While use of a single AC balance control is preferred, it will be appreciated that two separate controls could be used; e.g. eliminate control R16 and provide variable controls in place of resistors R15 and R17. It will further be evident that the AC balancing performance of the divider networks will be equally operable where there is only one AC input, e.g. where all of the applied signals are to be inverted or all are to be non-inverted.

The tracking power supply, generally designated 80, comprises transistor Q8 and associated biasing and temperature compensating components. Resistors R25, R26, and R27 are connected with the main power supply and provide bias for transistor Q8. Resistor R28 is of low value, e.g. 100 ohms, and included primarily to prevent high frequency parasitic oscillations in this segment of the circuit. The output voltage of tracking power supply 80, which is taken from the emmiter of Q8, will follow the main power supply. For example, if there is a decrease in the voltage of the main power supply the voltage at the center point of resistors R26 and R27, and hence, the voltage at the base of transistor Q8, will also decrease. This latter voltage drop causes a reduction in the current through resistor R25 and thus, a voltage drop at the output of the tracking power supply. The voltage produced by tracking power supply 80 provides two significant functions. First, as applied through load resistors R7 and R8, this tracking voltage assures that there will be balanced potentials on the respective inputs and outputs of MOSFET switches Q4 and Q5 so that these devices perform as true on-off switches. Secondly, as applied via the network comprising control R16 and resistors R15 and R17, the tracking voltage ensures that the quiescent potential at the inputs 41' and 42', of amplifier A4 will remain proportionally constant relative to the main power supply voltage which is supplied to that amplifier. That is to say, to achieve the proper, balanced performance of amplifier A4, it is necessary that the input voltage levels maintain a fixed relationship to the main power supply voltage. The combination of diodes D5 and D6 and resistors R29 and R30 provide temperature compensation so that the potential at the common junction of R26 and R27 will move appropriately with a change in temperature. Capacitor C8 is a decoupling capacitor for providing a low impedance at the output of the power supply.

It will be appreciated by one skilled in the art that the inverter circuit of FIG. 2A, as described so far, includes manually adjustable as well as automatically operable networks which eliminate or compensate for the distortional effects of the associated system and the operational environment in which the inverter is utilized. These precautions are taken to realize a primary object of this invention in providing balanced, 180° inversion of any portion of the composite video signal. Thus, the signals which are separated by the operation of MOSFET switches Q4 and Q5 pass through identical networks which are essentially electrically perfect. In furtherance of this object, it is preferred that the circuit provide unity gain between input and output. Thus the gain of amplifier A4 is selected in relation to the attenuation of the preceding divider circuits. As discussed above, the divider circuits consist of the appropriate combination of resistors R9, R15, R16, R17 and R14. With the provision of unity gain between the output of buffer Q3 and the output terminal 43' of amplifier A4, and with the proper adjustment of the compensating, balancing and correction networks, an applied video signal may be perfectly inverted, without loss of informational content.

Referring once again to FIG. 2A, two signal paths are provided at the output of amplifier A4. As shown, the video output of the inverter is derived from the path which includes resistor R22 and transistor Q6. This transistor is utilized as a buffer in an emitter follower configuration, with emitter resistor R23 and decoupling capacitor C7, to achieve a low output impedance for providing suitable coupling with the next stage. It will be appreciated that the impedance matching characteristics of this buffer and/or the need for an additional buffer will be determined by the impedance characteristics of the next stage in a given application.

The output of amplifier A4 is also applied via the second path through resistor R21 to the base of transistor Q7. This path constitutes the beginning of the feedback loop which selectively samples the video output and feeds an error voltage back, ultimately, through MOSFET switch Q1. Before discussing this feedback circuit in detail, it should be noted that resistors R21 and R22 are each of low value and are included to prevent the formation of parasitic oscillations.

Transistor Q7 with emitter resistor R24, is used in a low output impedance, emitter follower configuration to drive two identical MOSFET switches, Q9 and Q10 (See FIG. 2B). MOSFET switches Q9 and Q10 correspond functionally with switches 51 and 61, respectively, in FIG. 1, serving as single pole, single throw switches. As illustrated in FIG. 2B, these switches are alternately gated on by sampling pulses so that the output of transistor Q7 is supplied either through resistor R34 to MOSFET switch Q9 or through resistor R33 to MOSFET switch Q10. As described in detail with regard to FIG. 1, these sampling pulses are such as to selectively sample pairs of reference pedestals appearing at the output of the inverter circuit. Accordingly, the reference pedestal which represents the inverted video signal is fed through switch Q10, while the reference pedestal representing the non-inverted signal is fed through switch Q9. The symmetrical networks which follow switches Q9 and Q10 correspond generally with first and second sample and hold circuits, 50 and 60, respectively, of FIG. 1. Thus, potentials which are equivalent to the sampled pedestals are placed upon capacitors C3 and C2. Premature discharge of these potentials is prevented by high input impedance, unity gain buffers Q11 and Q12, which are MOSFET source followers with source resistors R35 and R36, respectively. The respective outputs of buffers Q11 and Q12 are first filtered by filter networks R37 and C9, and R38 and C10, then applied, respectively, to the negative and positive input terminals, 71 and 72, of operational amplifier 70. The differential, or common mode rejection, operation of this amplifier is as discussed in relation to FIG. 1. Thus, any resultant error voltage appearing at the output terminal 73 of operational amplifier 70 is fed back through resistor R40 and MOSFET switch Q1 to establish a balanced reference potential on capacitor C1. It is to be noted that a filter network consisting of resistor R39 and capacitor C11 is associated with this amplifier to remove any noise occasioned via the various switching operations of the circuit or spuriously coupled from other system components which interface with the inverter.

Transistor Q13, and the temperature compensating networks associated therewith perform the DC balance and offset functions of control 62 in FIG. 1. As shown in FIG. 2B, the potential available from the resistive emitter network, R41 and R42, of transistor Q13 can be applied to the positive input terminal 72 of operational amplifier 70 in order to vary the quiescent potential thereat. This provides the means for compensating for manufacturer's variations in the output performance of other components included in the circuit in order to achieve perfect balance between the potentials on the differential input terminals 71 and 72 of operational amplifier 70. If desired, this control network can be utilized to offset the circuit to operate in an unbalanced mode. Regardless of mode, i.e. balanced or unbalanced, to establish the desired DC level, adjustment is made of the base bias of transistor Q13, with resistor R48 providing coarse adjustment and resistor R47 in conjunction with resistor R46, providing fine adjustment. To further assure constant operation, the two networks, consisting of diode D7 and resistor R44, and diode D8 and resistor R45, provide compensation for temperature variations. Completing this stage, capacitors C12 and C13 are decoupling capacitors, while resistor R43 is of low value, and thus, a precaution against parasitic oscillations in this stage.

It should be noted that all of the MOSFET switches associated with the circuit are preferably of the diffusion type, i.e. DMOS devices. Since, under current technology, such devices are available in four transistor integrated circuit packages, e.g. SD 5000, manufacture of the preferred circuit is economical since there are two groups of four switches. Thus, switches Q1, Q2, Q4, and Q5 are adapted for inclusion in a first package while switches Q9, Q10, Q11, and Q12 are adapted for inclusion in a second package. To guard against damage of these DMOS switches by static charges created during production, resistors R2, R5, R6, R31, and R32 are provided.

Although the invention has been described in its preferred form, it will be apparent to those skilled in the art that various changes and modifications may be made without deviating from the inventive concepts set forth above. Accordingly, it is to be understood that the appended claims are intended to cover all such modifications which fall within the scope and spirit of the invention.

I claim:

1. A video clamp and inverter circuit comprising:
   (A) an input stage for receiving a composite television input signal, said input stage including a keyed clamp;
   (B) a video amplifier for selectively providing an inverted ouput signal and a non-inverted output signal at a common video output, said video amplifier including inverting and non-inverting input terminals;
   (C) a first switch, selectively operable, to connect the output of said input stage to the non-inverting input terminal of said video amplifier;
   (D) a second switch, selectively operable, to connect the output of said input stage to the inverting input terminal of said video amplifier; and
   (E) a feedback circuit, coupling the output of said video amplifier to said input stage, said feedback circuit being selectively operable to establish predetermined DC reference levels for said inverted and non-inverted output signals.

2. The circuit according to claim 1, wherein said feedback circuit further includes:
   (E1) a DC balance and offset control.

3. The circuit according to claim 2, further including:
   (B1) an AC balance control connected with the input terminals of said video amplifier for varying the respective amplitudes of said inverted and non-inverted output signals.

4. The circuit according to claim 1, wherein said feedback circuit includes:
   (E2) an operational amplifier having an output connected to said input stage, and having positive and negative differential inputs;
   (E3) a first sample and hold circuit, said first sample and hold circuit being selectively operable to sample the non-inverted output signal of said video amplifier and supply a first sampling potential to the negative input of said operational amplifier;
   (E4) a second sample and hold circuit, said first sample and hold circuit being selectively operable to sample the inverted output signal of said video amplifier and supply a second sampling potential to the positive input of said operational amplifier.

5. The circuit according to claim 4, further including:
   (C1) a first linearity correcting circuit connected between said second switch and the non-inverting input terminal of said video amplifier, and
   (D1) a second linearity correcting circuit connected between said second switch and the inverting input terminal of said video amplifier.

6. The circuit according to claim 5, further including:
   (D2) a first frequency and phase compensating network connected in parallel with said first linearity correcting circuit and
   (D3) a second frequency and phase compensating network connected in parallel with said second linearity correcting circuit.

7. The circuit according to claim 6, further including:
   (B1) an AC balance control connected with the input terminals of said video amplifier.

8. The circuit according to claim 7, further including:
   (F) a tracking power supply connected through respective resistive networks with said first and second switches and the input terminals of said video amplifier for supplying tracking DC potentials thereto.

9. The circuit according to claim 8, wherein said tracking power supply includes:
   (F1) a temperature compensating network.

10. The circuit according to claim 9, wherein there is substantially unity gain between the output of said input circuit and the output of said video amplifier.

11. The circuit according to claim 10, wherein said feedback circuit further includes:
    (E1) a DC balance and offset control connected with the positive input of said operational amplifier.

12. The circuit according to claim 11, wherein said DC balance and offset control includes:
    (E2) a temperature compensating network.

13. A method of selectively inverting a composite television signal, said television signal including blanking level portions and video signal portions, said video signal portions varying in amplitude between a blanking level and a reference white level, comprising the steps of:
    (A) raising selected blanking level portions to levels equal, respectively, to 50% of said reference white level to provide at least one pair of first and second reference pedestals;
    (B) Thereafter, for said at least one pair:
       (B1) producing a non-inverted reference signal representative of said first reference pedestal and an inverted reference signal representative of said second reference pedestal;
       (B2) balancing the relative DC levels of said inverted and non-inverted reference signals to equalize the levels of said first and second reference pedestals and thereby supply a balanced DC reference potential;
    (C) periodically clamping preselected blanking level portions of said television signal to said balanced DC reference potential; and
    (D) inverting preselected portions of said television signal relative to said balanced DC reference potential.

14. The method according to claim 13, wherein said step (A) includes:
    (A1) raising preselected portions of vertical blanking intervals of said television signal.

15. The method according to claim 13, wherein said step (A) includes:
    (A2) raising portions of the front and back porches of preselected horizontal synchronization pulses of said television signal.

16. The method according to claim 15, wherein said step (A) includes:
 (A3) raising preselected portions of vertical blanking intervals of said television signal.

17. The method according to claim 14, said step (C) being performed in predetermined synchronization with said step of balancing (B2).

18. The method according to claim 15, said step (C) being performed in predetermined synchronization with said step of balancing (B2).

19. The method according to claim 16, said step (C) being performed in predetermined synchronization with said step of balancing (B2).

* * * * *